UNITED STATES PATENT OFFICE.

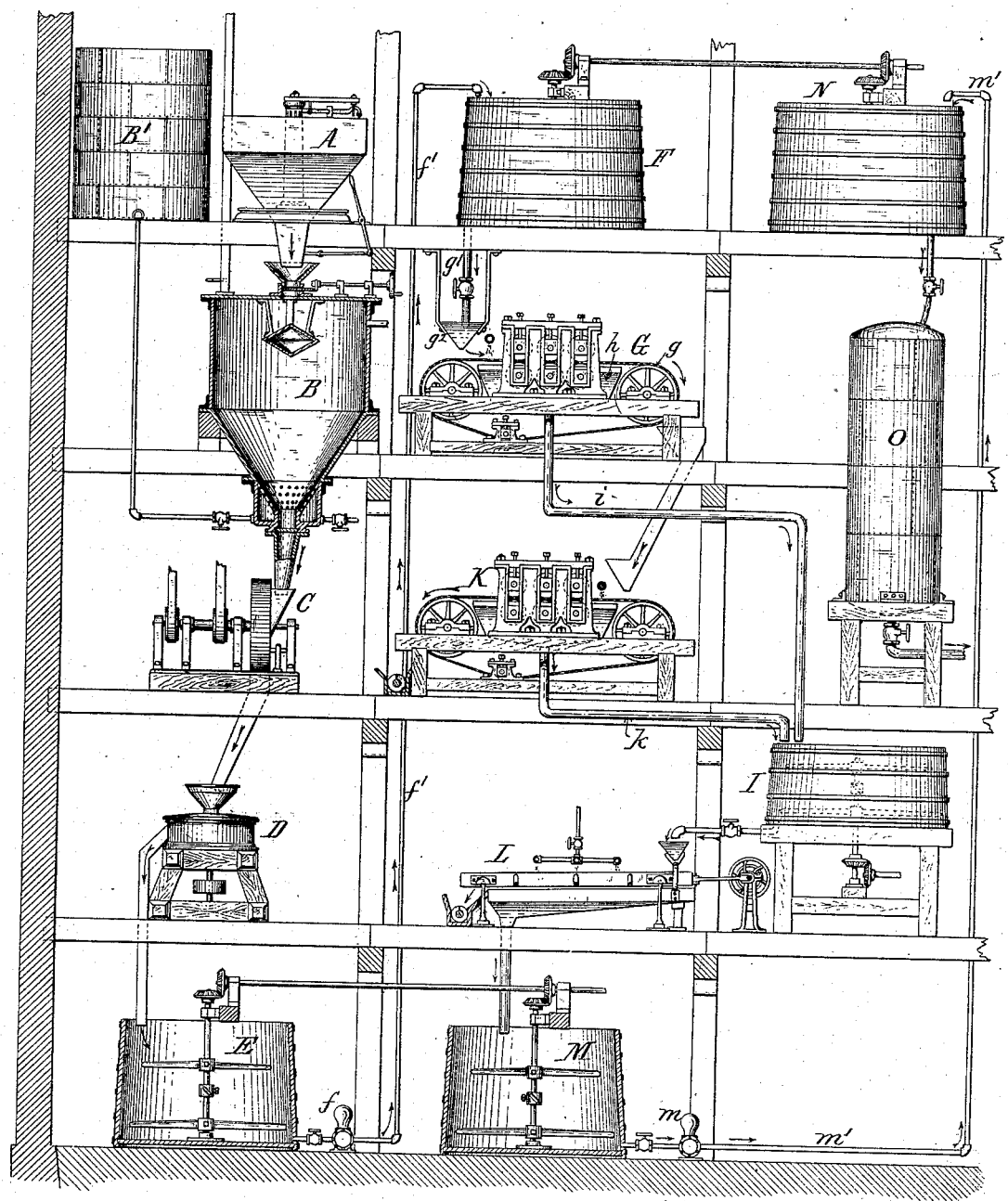

THOMAS A. JEBB AND WILLIAM T. JEBB, OF BUFFALO, NEW YORK.

METHOD OF AND APPARATUS FOR OBTAINING STARCH FROM GRAIN, &c.

SPECIFICATION forming part of Letters Patent No. 258,070, dated May 16, 1882.

Application filed February 9, 1882. (No model.)

*To all whom it may concern:*

Be it known that we, THOMAS A. JEBB and WILLIAM T. JEBB, of the city of Buffalo, in the county of Erie and State of New York, have invented new and useful Improvements in the Method of and Apparatus for Obtaining Starch from Grain for the Manufacture of Grape-Sugar and other Products, of which the following is a specification.

This invention relates to an improvement in the art of obtaining starch from grain for the purpose of converting such starch into grape-sugar, glucose, spirits, or other products.

Heretofore one of three principal methods has generally been employed for this purpose. The first method, which is most widely practiced at the present time, consists, briefly, in separating the starch-water from the ground grain by sifting, then permitting the starch to settle out of the water in which it is suspended, then drawing off the water and mixing alkali with the starch to render the gluten soluble, then adding water to the mixture and running the same over depositing-tables, upon which the starch is deposited while the gluten runs off, then removing the deposited starch from these tables and purifying it by repeated washing and settling. This method produces good starch; but it requires a great deal of room for the accommodation of the numerous settling and washing vats, depositing-tables, &c., and the principal defect consists in the use of alkali, which latter is never entirely eradicated from the starch, and which causes various difficulties in the subsequent conversion of the starch into grape-sugar or glucose. For the purpose of effecting this conversion sulphuric or oxalic acid is added to the starch. This acid is to a large extent neutralized by the remaining alkali, which forms with the acid a salt, which imparts to the grape-sugar or glucose a disagreeable bitter after-taste. The presence of the alkali also necessitates the employment of a large quantity of acid, as that portion of the acid which combines with the alkali does not aid in effecting the desired conversion. Another great objection to this process is the enormous quantity of water which is required for the repeated washing of the material and the power expended in pumping such water and in breaking up the starch after each settling.

Another well-known process is distinguished by repeatedly siphoning the water holding the starch in suspension from the offal which has been deposited on the bottom of the settling-vats. This method requires still more room and water than the process first mentioned. It has been attempted to avoid the objections of these methods in the manufacture of grape-sugar or glucose by converting the ground grain directly without first extracting the starch from the grain, and this method produces grape-sugar which is sweeter than the sugar produced from starch obtained by the alkali process; but the sugar so produced is discolored by the bran and gluten which are present in the material during the conversion of the starch into grape-sugar.

The object of this invention is to extract the starch from the grain and prepare such starch for the final conversion into grape-sugar, spirits, or such other product as may be desired in a simple and direct manner and without the drawbacks and objectionable features which exist in the now known methods.

The accompanying drawing represents a sectional elevation of a train of machinery or apparatus whereby our improved method is carried out.

A represents the weigh-hopper or other receptacle in which the grain to be worked up is received, and from which it passes to the steep-tub B, which is arranged below the hopper A. The steep-tub is preferably constructed as described and shown in Letters Patent of the United States No. 240,907, granted to us May 3, 1881, so that the grain is steeped and freed from the accompanying impurities at the same time. The grain is steeped in this tub for a sufficient length of time to thoroughly soften it without causing fermentation to set in, and the steep-water is preferably maintained at a temperature of from 120° to 130° Fahrenheit.

B' is a hot-water tub or tank from which water is supplied to the steep-tub B.

C represents a disintegrating-mill of any suitable or well-known construction, which receives the softened grain from the steep-tub, and in which the grain is coarsely ground or broken. We prefer to employ a mill provided with several concentric rows of pins which revolve in opposite directions.

D represents one or more grinding-mills of any suitable or well-known construction, which receive the coarsely-broken grain and reduce the same to such a degree of fineness that the bran and gluten can be separated from the starchy portions of the kernels. By first reducing the grain coarsely in the disintegrating-mill, and then grinding the reduced grain to the required degree of fineness in the subsequent grinding-mill D, each apparatus can be adjusted to accomplish its peculiar function to the best advantage, and the crowding of the mills and the waste of power resulting therefrom is avoided and a more uniformly-ground product is obtained. As the capacity of a disintegrating-mill is much greater than that of the subsequent grinding-mill, a single disintegrating-mill will effect the preliminary reduction of the grain for several of the subsequent grinding-mills D.

Both the disintegrating-mill and the subsequent grinding-mills may be supplied with water to facilitate the reduction of the grain.

E represents a receiving tub or vat in which the ground material is received from the grinding mill or mills D, and in which it is thoroughly mixed by a rotating stirrer or other suitable agitator. The material is elevated by a pump, $f$, and pipes $f'$ from the receiver E to a receiver, F, located in the upper part of the building, from which latter receiver the material is distributed to the separating-machines. The receiver F is also provided with a rotating stirrer, whereby the material is kept in agitation.

G represents a separating-machine whereby the starch-water is separated from the bran, gluten, &c. This separating-machine consists of one or more pairs of horizontal rollers, between which passes an endless apron of wire-cloth or other strong porous or perforated material which permits the starch-water to pass through its meshes, while the bran, gluten, and other coarse matter remain on its surface. The material is delivered upon the endless apron $g$ of this separator by a pipe, $g'$, and transverse feed-trough $g^2$, or other suitable means, whereby the material is evenly distributed over the entire width of the feed-apron. A large portion of the starch-water passes directly through the meshes of the endless apron, and the remainder of the starch-water is pressed out of the material by the rollers. The pressure applied to the material as it passes between the rollers separates the greater portion of the starch from the bran and other coarse material. The starch-water is collected in a trough, $h$, underneath the apron, and conducted therefrom by a pipe, $i$, to a receiving-tub, I.

If desired, the separation of the starch from the coarse material may be accelerated by sprays of water delivered by perforated pipes upon the endless apron of the separator.

K represents a secondary separating-machine constructed and operating in all respects like the first-described separator G, and arranged to receive the tailings from the first separator and subject the same to a further separating operation. If desired, the tailings may be mixed with water before they are fed to the second separator. The starch-water derived from the second separation is conducted by a pipe, $k$, to the receiving-tub I.

It is obvious, of course, that a number of such separators may be employed in each separation, according to the quantity of grain operated upon.

The receiving-tub I is provided with a revolving or other suitable agitator, whereby the starch-water is kept in motion and the starch prevented from settling.

L represents a shaking-separator covered with bolting-cloth, which receives the starch-water from the receiver I, and whereby the fragments of bran and other coarse material which may still be contained in the starch-water are separated therefrom. The separator is preferably constructed as shown and described in Letters Patent of the United States No. 249,056, granted to Thomas A. Jebb, November 1, 1881.

M is a tank which receives the starch-water from the separator L, and $m$ is a pump by which the starch-water is drawn from the tank M and forced through a pipe, $m'$, into a receiver, N, located in the upper portion of the building.

O represents a converter of any suitable or well-known construction, either open or closed, whereby the starch is converted into grape-sugar or glucose, as may be desired. If the ultimate product desired is spirits or laundry-starch, the apparatus to which the starch-water is conducted from the final separator L is of course constructed with reference to the production of the desired goods. If the liquid in the final receiver, before it is converted into the desired ultimate product, should not have the proper density, its specific gravity may be increased by adding a suitable quantity of starch which has been obtained by depositing it on tables or in any other suitable manner.

If desired, the tailings from the several separators K may be reground with water to liberate the starch which may still adhere to the bran, and this starch may be extracted by separating the starch-water from the bran and other coarse offal, and then treating it with alkali and depositing the starch on tables. The starch so recovered will be very small in quantity and of inferior quality from that produced by the main process, and should be converted or be otherwise worked up separately.

It will be seen from the foregoing that our improved method is a continuous one, in which the material is kept in motion and follows its course through the different stages of the process without interruption until it reaches the final receiver.

The advantages which are derived from this method are chiefly: a large saving in room and in the number and capacity of the tubes and separators, whereby the first cost of the machinery is greatly reduced; a saving in the power required for operating the machinery, as the starch is not permitted to settle, and therefore does not require to be repeatedly broken up, as in the old process; a greater yield of starch, as the repeated washing of the starch, whereby in the old process a considerable quantity of the starch is carried off, and the loss of starch by being carried over the ends of the depositing-tables, are avoided; a large saving in time, as the material is not permitted to come to rest, and the starch is made ready for the final conversion into the desired product in a few hours; and, finally, the production of purer starch, and consequently a purer ultimate product, as no alkali is employed, and the time during which the material is treated is so much reduced that fermentation cannot set in.

We claim as our invention—

1. As an improvement in the art of extracting starch from grain, the herein-described method, which consists in first reducing the grain with water, and then subjecting the reduced grain to pressure, whereby the starch-water is pressed out and separated from the bran and other coarse matter.

2. As an improvement in the art of extracting starch from grain, the herein-described method, consisting in first coarsely disintegrating the grain, then reducing the grain in a separate machine to the proper degree of fineness, and then separating the starch-water from the bran and other coarse particles by pressure.

3. As an improvement in the art of extracting starch from grain, the herein-described method, consisting in first reducing the grain with water, then separating the starch-water from the bran and other coarse particles by pressure, and then treating the starch-water for the production of the desired product, the material passing through the several stages of the process continuously and without interruption.

4. As an improvement in the art of extracting starch from grain, the herein-described method, which consists in first reducing the grain with water, then separating the starch-water from the bran and other coarse particles by pressure, and then separating the remaining impurities from the starch-water by sifting.

5. As an improvement in the art of extracting starch from grain, the herein-described method, which consists in first reducing the grain with water, then separating the starch-water from the bran and other coarse material, and treating the starch-water for obtaining the desired product, then regrinding the bran and other coarse material separately and extracting the starch from this ground material separately.

6. In apparatus for extracting starch from grain, the combination of a reducing mechanism whereby the grain is reduced to the desired degree of fineness with water, and a separating-machine composed of an endless perforate or porous apron and pressure-rollers, which receive the reduced grains, whereby the starch-water is separated from the coarse particles, substantially as set forth.

7. In apparatus for extracting starch from grain, the combination of a reducing mechanism whereby the grain is reduced to the desired degree of fineness, a separating-machine whereby the starch-water is separated from the bran, &c., and a subsequent separator, whereby the remaining impurities are separated from the starch-water, substantially as set forth.

8. In apparatus for extracting starch from grain, the combination of a steep, B, preliminary disintegrator C, grinding-mill D, receiver E, separator G, and subsequent separator L, substantially as set forth.

THOMAS A. JEBB.
WILLIAM T. JEBB.

Witnesses:
JOHN TULLY,
WEDE ANDREW.